United States Patent [19]

Schulz

[11] 4,042,084
[45] Aug. 16, 1977

[54] VEHICLE CLUTCH CONTROL ASSEMBLY

[75] Inventor: John Carl Schulz, Burlington, Iowa

[73] Assignee: J. I. Case Company, Racine, Wis.

[21] Appl. No.: 677,282

[22] Filed: Apr. 15, 1976

[51] Int. Cl.² .............. B60K 41/24; B60K 41/26; F16D 67/02; F16H 57/10
[52] U.S. Cl. ...................... 192/13 R; 192/4 A
[58] Field of Search .................. 192/13 R, 4 A

[56] References Cited

U.S. PATENT DOCUMENTS

| 1,125,695 | 1/1915 | Kromer | 192/13 R |
| 1,592,176 | 7/1926 | Brown | 192/13 R |
| 1,609,637 | 12/1926 | Wyman | 192/13 R |
| 1,885,442 | 11/1932 | Holland | 192/13 R |
| 1,886,569 | 11/1932 | Medlock | 192/13 R X |
| 2,017,989 | 10/1935 | Pleasonton | 192/13 R |
| 2,068,185 | 1/1937 | Kreis | 192/13 R X |
| 2,117,925 | 5/1938 | Van Meter | 192/13 R |

Primary Examiner—Samuel Scott
Assistant Examiner—Don E. Ferrell
Attorney, Agent, or Firm—Arthur J. Hansmann

[57] ABSTRACT

A vehicle clutch control assembly for use with a hydraulic transmission having a fluid valve. A brake pedal and linkage are connectable with the valve for positioning the clutch in the engaged and disengaged positions. A clutch valve lock-out assembly is also connected with the brake pedal to prevent actuation of the clutch valve when the lock-out assembly is selectively operated, and thus the clutch cannot go through the neutral position when the brake is actuated in the normal manner.

3 Claims, 2 Drawing Figures

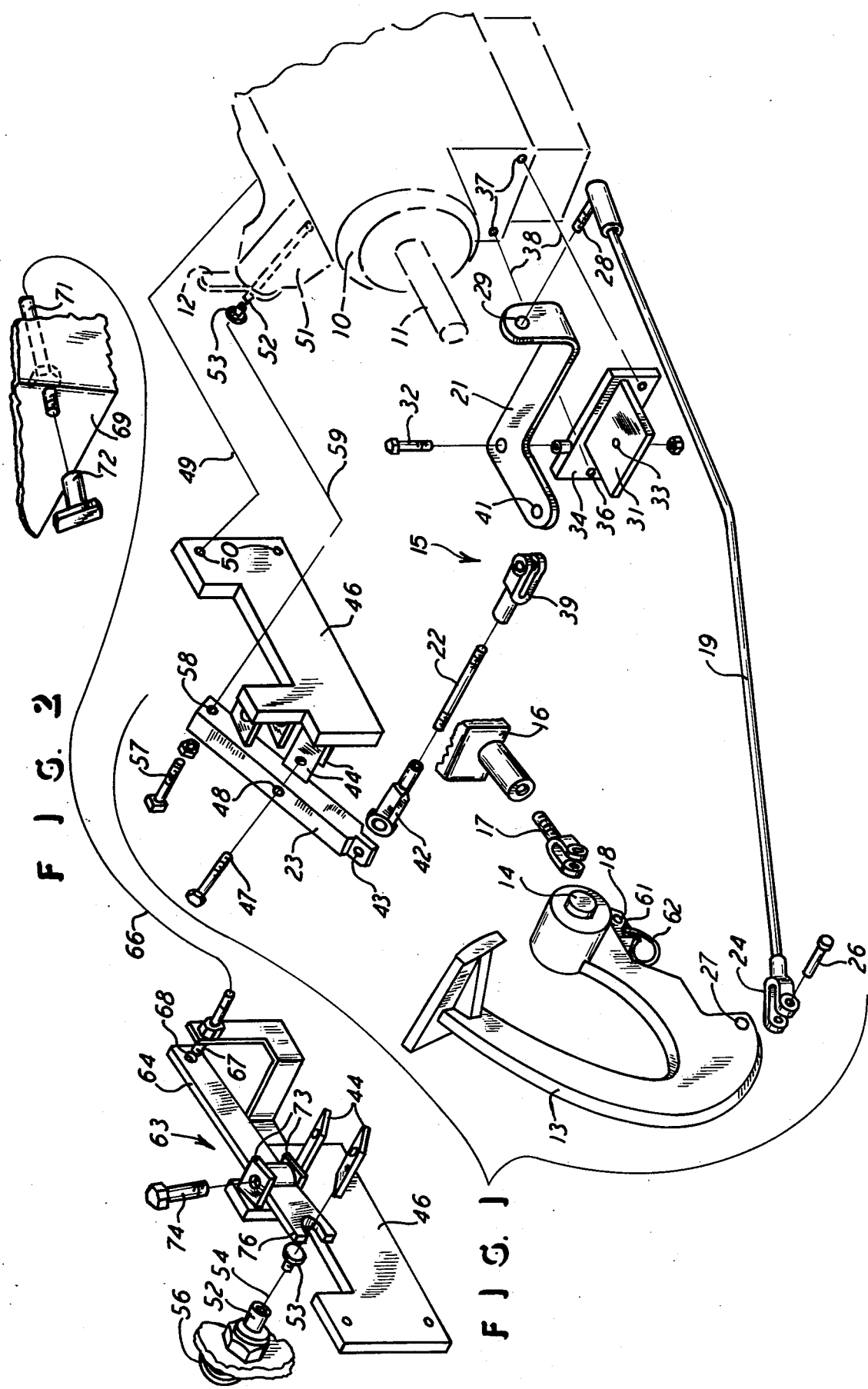

VEHICLE CLUTCH CONTROL ASSEMBLY

This invention relates to a vehicle clutch control assembly, and, more particularly, it relates to a control assembly in the nature of a clutch disconnect lock-out arrangement which selectively precludes the actuation of the clutch to thereby prevent clutch actuation through the neutral mode when actuating the clutch between the engaged and disengaged positions.

BACKGROUND OF THE INVENTION

The prior art is already aware of the use of transmissions and clutches for vehicles and lift trucks and the like, and these commonly take the form of hydraulic transmissions with clutches which can be positioned in the forward and reverse and neutral drive positions. The clutches of course are under control of the operator, and suitable linkage and like connectors are connected with the clutch unit and are maneuvered by the operator for desired setting of the clutch. Also, the prior art is aware of the aforementioned arrangements used in conjunction with clutch controls which initially position the clutch in the engaged and neutral and disengaged positions, and these controls are arranged with linkages and control elements available to the operator who can position the clutch in the engaged or disengaged positions, as mentioned. However, in instances where the clutch is moved between the engaged and disengaged positions, the clutch inherently moves through the neutral position, and, as such, it is undesirable in that it permits the vehicle or other mobile unit to be free to move, such as on an incline.

Accordingly, it is a primary object of this invention to provide a vehicle clutch control assembly wherein a single foot brake is employed and has linkage extending to the vehicle clutch itself, for controlling the engaged and disengaged positions of the clutch, and with the assembly being arranged so that the clutch will not move through a neutral position when the brake pedal is actuated. As a consequence, the vehicle will not be free to move, such as on an incline, since the clutch will actually remain engaged while the brake pedal itself is being applied and when the assembly is in that particular mode or setting which is under the selective control of the operator.

Still further, the present invention provides a vehicle clutch control assembly which is compact, reliable, a general improvement upon the assemblies and combinations of brake pedals and clutch controls heretofore known, and one which can render the vehicle brake and vehicle clutch under the control of a single brake pedal but which also permits the operator to selectively lock out or disable the clutch mechanism and to preclude its function even when the brake pedal is being actuated though it can otherwise be interconnected with the vehicle clutch. That is, the invention provides a single pedal control, such as the brake pedal, which is a single pedal control for both the brakes and the clutch, and the entire assembly is arranged so that the operator can preclude the brake pedal control over the clutch, and this is accomplished by the clutch disconnect lock-out arrangement of this invention. Accordingly, when the operator has energized the clutch disconnect lock-out arrangement of this invention, the entire assembly can still utilize a single brake pedal for control of the brakes and the clutch, but at the time of the energizing of the lock-out arrangement only the vehicle brakes will be operated by the single brake pedal.

Other objects and advantages will become apparent upon reading the following description in light of the accompanying drawings.

BRIEF DESCRIPTION OF THE DRAWINGS

FIG. 1 is an exploded perspective view of a portion of the elements of this invention shown relates to a standard transmission and clutch arrangement in dot-dash lines.

FIG. 2 is a perspective view of the particular clutch lock-out subassembly of this invention utilized in connection with the showings in FIG. 1.

DETAILED DESCRIPTION OF THE PREFERRED EMBODIMENT

The drawings show the vehicle clutch control assembly of this invention, and it is shown applied to a conventional type of combined hydraulic transmission and clutch generally designated 10 and shown in dot-dash lines. The usual transmission drive shaft 11 and a clutch control lever 12 are included in the showing of the fragment of the transmission assembly, and this conventional assembly may be the one of the model 72 series of Borg-Warner Corporation of Muncie, Ind. and as shown in their catalogue Form 1121/12-71. That is, the assembly 10 is of a conventional design, and will be understood by one skilled in the art, and the elements of this invention are relatable to and connectable with the assembly 10 in the manner shown and hereinafter described and as will be apparent to one skilled in the art.

A brake pedal 13 is suitably mounted for rotation about its shaft 14, and the mounting may be on a vehicle, such as a lift truck or the like, and thus the operator can depress the pedal 13 for actuating the linkage hereinafter described, all apparent to one skilled in the art and with the understandable arrangement of a single brake pedal 13 for controlling the vehicle brakes and the clutch, as selectively desired by the operator. Thus, FIG. 1 further shows a fragment of a vehicle hydraulic brake cylinder 16 which is connected with the pedal 13 by means of the clevis 17 which would attach to the pedal at the opening designated 15, in a conventional manner. Thus, upon depressing the pedal 13, the hydraulic type of brake 16 would be actuated and the vehicle brakes would be applied, all in the usual arrangement of connecting a brake pedal with a master cylinder, as shown and as described herein.

Clutch control linkage, generally designated 18, is also connected with the brake pedal 13, and it includes the rod 19 and the lever 21 and the rod 22 and the fulcrummed lever 23. Thus, the one end of the rod 19 has a clevis 24 attached thereto, and the clevis is secured to the pedal 13 by means of a pin 26 which extends into an opening 27 in the pedal 13. The other end of the rod 19 has a stud 28 which extends into an opening 29 in the lever 21 which is mounted on a vehicle frame plate 31 by means of a pivot bolt 32, and thus the lever 21 can of course pivot about the upright axis of the bolt 32 which extends through an opening 33 in the frame plate 31. Also, the frame plate 31 is suitably secured with an upright plate 34 which has openings 36 which align with openings 37 in the transmission unit 10, and thus the assembly would be arranged such that the plate 34 would be located against the transmission 10, and suitable screws would pass through the aligned hole 36 and 37 for securing the plate 34 with the unit 10, and the lines designated 38 indicate the arrangement and alignment and assembly of parts, as do other alignment lines shown and which are commonly utilized for indicating the assembly of the various parts from their exploded view position, all in the conventional drawing display.

The rod 22 is connected through a clevis 39 to the lever 21 by attaching in the lever opening 41, such as by means of an unshown pin, and the other end of the rod 22 is attached to another clevis 42 which attaches to the lever 23 at the opening 43 in the lever 23, such again as by means of an unshown pin. Also, the lever 23 is pivotally mounted on spaced-apart plates 44 on a support plate 46, and a pivot bolt 47 extends through the plates 44 and the member 23, such as passing through the opening 48 in the member 23, all to pivotally mount the member 23 for pivot movement about the axis of the bolt 47. It will further be understood that the plate 46 is attached to the side of the unit 10, and the exploded drawing line 49 indicates the location of that attachment such that the screw openings 50 in the plate 46 align with unshown openings in the unit 10 for mounting the plate 46 on the side of the unit 10, as indicated by the line 49.

At this time it will be mentioned, and it will be understood by one skilled in the art and reference has already been made to the disclosure of the conventional transmission and clutch unit 10, that the unit 10 includes a valve section designated 51 and that valve section is in the form of a conventional clutch, and it has a conventional movable plunger 52, in the form of a conventional shuttle and as also seen in FIG. 2, and the plunger or shuttle 52 extends from the clutch and valve unit 51 and it is available to receive a flat headed button 53 which can actually thread into the extended plunger 52, as also shown in FIG. 2. As mentioned, the arrangement of the unit 10 with the valve and clutch section 51 is conventional, and the plunger 52 is therefore movable member positionable between a clutch engage position and a clutch disengage position and an intervening clutch neutral position, all possible when the shuttle-type plunger 52 is moved along its longitudinal axis, such as designated by the line 54 in FIG. 2, and all in a conventional arrangement of this standard equipment. FIG. 2 also shows a compression spring 56 which is arranged and disposed to urge the plunger 52 outwardly from the unit 51, in a usual arrangement of a plunger or shuttle under a constant spring load. Thus, the lever 23 has a screw 57 extending through an opening 58 in the end of the lever 23, and the end of the screw 57 aligns with the button 53 attached to the plunger 52, and thus the lever 23 will bear against the button 53 and push the plunger 52 against the urging of the spring 56, all for actuating the valve unit 51 between the engaged position and the neutral position and the disengaged position. The alignment and assembly drawing line 59 further shows the arrangement of the parts just described.

Accordingly, it will now be seen and understood that upon depressing the brake pedal 13, the rod 19 is displaced toward the unit 10 and the lever 21 is pivoted about its pivot bolt 32 and the rod 22 is displaced to pivot the lever 23 and thus move the screw 57 away from the button 53 and thereby leave the plunger 52 under the urging of the spring 56, and that would be the outwardly extended position for the plunger 52, such as shown in FIGS. 1 and 2. It will also be understood that the brake pedal 13 is under the usual spring urging so that when the operator releases his foot from the pedal 13 the linkage 18 will return to a position such that the screw 57 will bear against the button 53 and urge the plunger 52 against the spring 56 and thus inwardly in the valve unit 51 to thereby cause the valve and clutch unit 51 to be in an engaged position and ready for operation. Accordingly, a tension spring can be connected to the brake pedal at an opening 61, and a fragment of a spring 62 is shown for that arrangement.

FIG. 2 shows a lock-out assembly 63 which is attached to the plate 46 and includes a lever 64 and a control cable 66. The cable 66 extends between an axially movable end 67 attached in an opening 68 in one end of the lever 64, and the cable 66 extends to a panel or dashboard 69 where the cable has an end 71 affixed thereto and a control knob 72 is suitably attached to the end of the cable 66. Therefore, in a usual arrangement of a slidable cable, as indicated by the line 66 and the shown end 67 and 71, the operator can push and pull on the member 72 for sliding the cable 66 and thereby pivoting the lever 64. The lever 64 is pivotally mounted on the plate 46 by means of the plates 73 which are secured to the plate 46, and a pivot bolt 74 extends through the plates 73 and through an opening in the lever 64 for pivotally mounting the lever 64 about the longitudinal axis of the bolt 74.

The end 76 of the lever 64 is bifurcated and aligns with the button 53, and the bifurcated end 76 will contact the head of the button 53 when the lever 64 is pivoted to have its end 76 move toward the button 53 and thus toward the spring-loaded valve plunger 52. Accordingly, when the operator retracts or pulls on the handle member 72, the cable 66 is retracted to pivot the lever 64 in a direction so that the lever end 76 bears against the button 53 to thus axially move the valve shuttle plunger 52 against the spring 56. That action is the lock-out action for the clutch valve unit 51, and it actually holds the unit 51 in the clutch engaged position. Thus, the brake controlled clutch control member in the form of the bolt 57 projects through the bifurcated opening and contacts the button 53, for operating the valve clutch unit 51, as mentioned. However, with the lock-out assembly in the operative position described, namely, with the cable 66 retracted, the button 53 and the shuttle plunger 52 are depressed by the lever 64 and thus the lock-out action is effective and the brake pedal will not permit the valve clutch unit to move from the engaged position and through the neutral position and to the disengaged position. Accordingly, the clutch unit will not move to the neutral position, and thus that undesirable action of having the clutch move to the neutral position will not occur.

Of course, when it is desired that the brake pedal 13 control the clutch unit 51, then the lock-out assembly 63 will not be operative and the operator will simply have pushed the control handle 72 inwardly so that the cable 66 would be extended and the attached lever 64 would have pivoted to where its end 76 would release the button 53 and thus permit the valve shuttle 52 to move outwardly to the clutch disengaged position, as desired at that time.

In summary, with the cable 66 having its handle 72 inwardly and in the so-called inoperative position, the plunger 52 is free to be moved outwardly under the urging of the spring 56, as far as the lock-out assembly 63 is concerned. Therefore, depressing the pedal 13 will cause the linkage 18 to move to pivot the lever 23 and thereby retract the bolt 57 relative to the plunger button 53, and thus the plunger can move to the outward or clutch disengaged position, as desired. Conversely, with the cable handle 72 in the outward mode, the plunger 52 is held inwardly by the lever 64 and thus the shuttle and clutch unit 51 are engaged, and therefore action of the pedal 13 will have no effect upon the plunger 52, as desired in that mode. In these respects, the lock-out assembly 63 with its cable 66 operates on the plunger 52 in a manner opposite from that of the brake pedal 13 and its linkage 18 and the bolt 57, such that the bolt 57 allows the plunger 52 to move outwardly under the urging of the spring 56, but the lock-out assembly 63 holds the plunger shuttle 52 inwardly against the urging of the spring 56. With this entire arrangement, a single pedal 13 can be utilized for controlling the mobile unit brakes as well as controlling the clutch unit 51 in the manners detailed above.

What is claimed is:

1. A vehicle clutch control assembly for use with a hydraulic transmission, comprising a fluid valve with an axially movable plunger axially positionable between a clutch engaged position and a clutch disengaged position and an intervening clutch neutral position, a spring operatively associated with said plunger for yieldingly urging said plunger to the clutch disengaged position, a brake pedal, linkage connected to said brake pedal, a lever connected with said linkage and having a portion engagable with said plunger and axially urging said plunger against the urging of said spring and thus to the clutch engaged position, and said lever portion being operatively associatable with said plunger for allowing movement of said plunger from the clutch engaged position and through the clutch neutral position and to the clutch disengaged position, and a lock-out assembly selectively operatively associatable with said plunger and separately from any interconnection with said linkage and including a portion abuttable on said plunger for restraining said plunger in the clutch engaged position irrespective of the position of said brake pedal and said linkage, said lock-out assembly thereby being arranged to be associatable with said plunger to induce movement of said plunger in the axial direction opposite from that induced by said linkage.

2. The vehicle clutch control assembly as claimed in claim 1, wherein said lock-out assembly includes a cable with a lever connected to said cable and having said lock-out assembly portion thereon.

3. The vehicle clutch control assembly as claimed in claim 1, wherein said portions of said linkage and said lock-out assembly both include a lever arranged to be operable on said plunger, and with a remote control connected to said lock-out assembly lever to selectively position said lever in an operative position relative to said plunger.

* * * * *